United States Patent
Chang et al.

(10) Patent No.: US 12,497,646 B2
(45) Date of Patent: Dec. 16, 2025

(54) NUCLEIC ACID-MEDIATED PATTERN REPLICATION AND METHOD OF MANUFACTURING 2-D MATERIAL USING THE SAME

(71) Applicant: Korea Advanced Institute of Science and Technology, Daejeon (KR)

(72) Inventors: Jae-Byum Chang, Daejeon (KR); Jueun Sim, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 1063 days.

(21) Appl. No.: 17/510,690

(22) Filed: Oct. 26, 2021

(65) Prior Publication Data
US 2022/0127662 A1    Apr. 28, 2022

(30) Foreign Application Priority Data

Oct. 27, 2020 (KR) .................. 10-2020-0139928
Jul. 20, 2021 (KR) .................. 10-2021-0095105

(51) Int. Cl.
*C12Q 1/6806* (2018.01)
*C12N 15/11* (2006.01)
*C12Q 1/6869* (2018.01)

(52) U.S. Cl.
CPC ............ *C12Q 1/6806* (2013.01); *C12N 15/11* (2013.01); *C12Q 1/6869* (2013.01)

(58) Field of Classification Search
CPC ........ B01J 2219/00529; B01J 19/0046; C12Q 1/6806
See application file for complete search history.

(56) References Cited

U.S. PATENT DOCUMENTS

2007/0178516 A1    8/2007   Sosnowski

FOREIGN PATENT DOCUMENTS

| GB | 2440209 A | 1/2008 | |
|---|---|---|---|
| JP | 2015-008308 A | 1/2015 | |
| KR | 1020010036009 A | 5/2001 | |
| KR | 1020020067132 A | 8/2002 | |
| KR | 20040055442 A * | 6/2004 | .......... C12Q 1/6837 |
| KR | 1020040055441 A | 6/2004 | |

(Continued)

OTHER PUBLICATIONS

European Search Report for related Application No. EP21204998 dated Feb. 24, 2022.

(Continued)

*Primary Examiner* — Andrew J Bowman
(74) *Attorney, Agent, or Firm* — ArentFox Schiff LLP; Joseph M. Maraia; Marlo S. Grolnic

(57) ABSTRACT

Provided are the nucleic acid-mediated pattern replication and a method of manufacturing a 2-D material using the same. A method of manufacturing a 2-D material according to an embodiment may include preparing a first material having a first nucleic acid patterned on a surface thereof, bonding a linker-nucleic acid to the first nucleic acid, bonding the first nucleic acid and a second nucleic acid attached to a surface of a second material through the linker-nucleic acid and replicating a pattern of the first material to the surface of the second material, separating the first material, and applying a third material on a pattern replicated to the surface of the second material.

17 Claims, 22 Drawing Sheets

(56) References Cited

FOREIGN PATENT DOCUMENTS

| KR | 1020040055442 A | 6/2004 |
|----|-----------------|--------|
| KR | 1020040062847 A | 7/2004 |
| WO | 2006058246 A2  | 6/2006 |
| WO | 2008022332 A2  | 2/2008 |

OTHER PUBLICATIONS

Lin Haohao et al: "Replication of a DNA Microarray", Journal of the American Chemical Society, American Chemical Society, vol. 127, No. 32, Aug. 1, 2005 (Aug. 1, 2005), pp. 11210-11211, XP002597202, ISSN: 0002-7863, DOI: 10.1021/JA051914U.

\* cited by examiner

FIG. 4
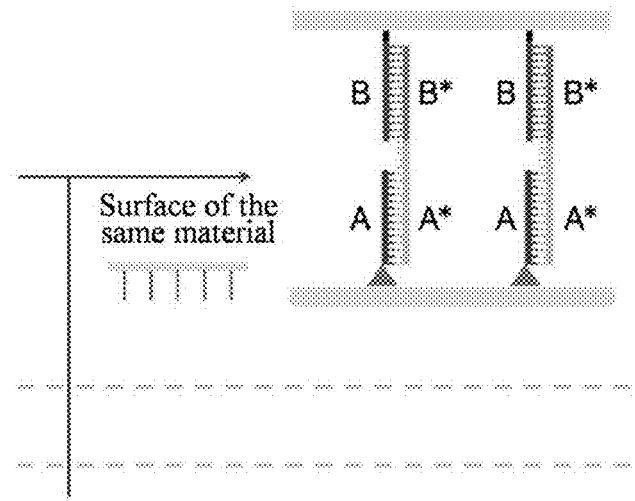
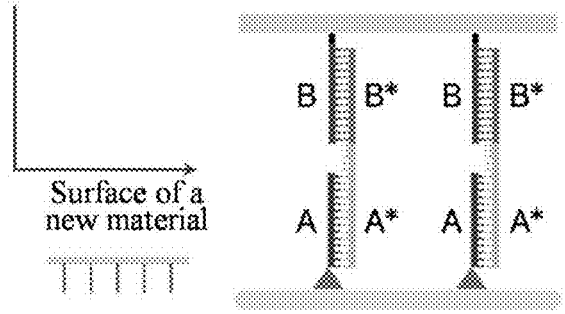

| Classification | Interaction between DNA strands | ① Shaped hydrogel synthesis |
|---|---|---|
| Test group | 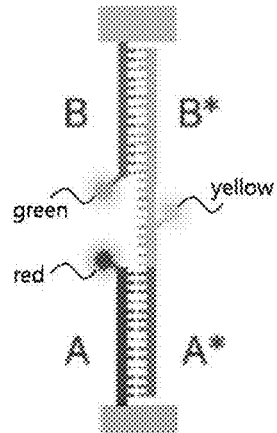 | 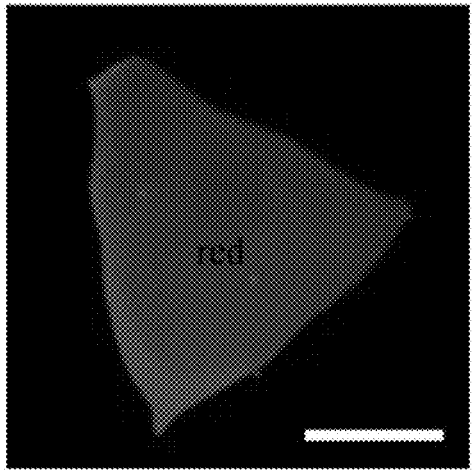 |
| | Complementary base pairing occurs between A-A* and B-B*. | A triangular original hydrogel containing DNA A on its surface was synthesized. |
| Control group | 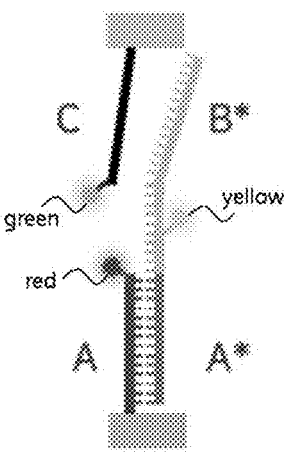 | 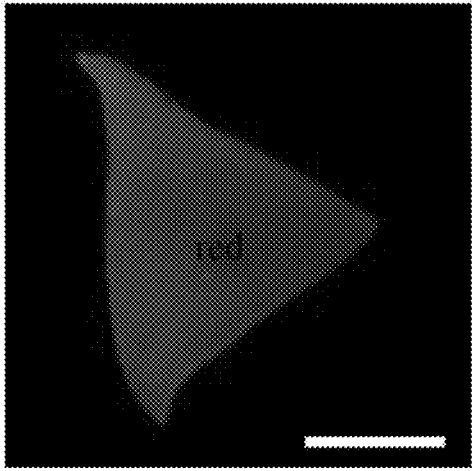 |
| | C and B* strands are not complementary to each other | A triangular original hydrogel containing DNA A on its surface was synthesized. |

FIG. 16

| Step | ① Labeling of a target protein and the hybridization of a linker-DNA |
|---|---|
| Microscopic view<br><br>▲ Target molecule (NeuN)<br><br>DNA-conjugated anti-NeuN antibody<br><br>Linker-DNA | |
| Macroscopic view<br><br>Original brain slice<br><br>Replica DNA-hydrogel | |
| | Confocal microscopy imaging a brain slice stained with a DNA-conjugated anti-NeuN antibody |

Confocal microscopy image of the replica hydrogel (violet) showing the replicated NeuN pattern (white) of the brain slice on its surface

FIG. 20

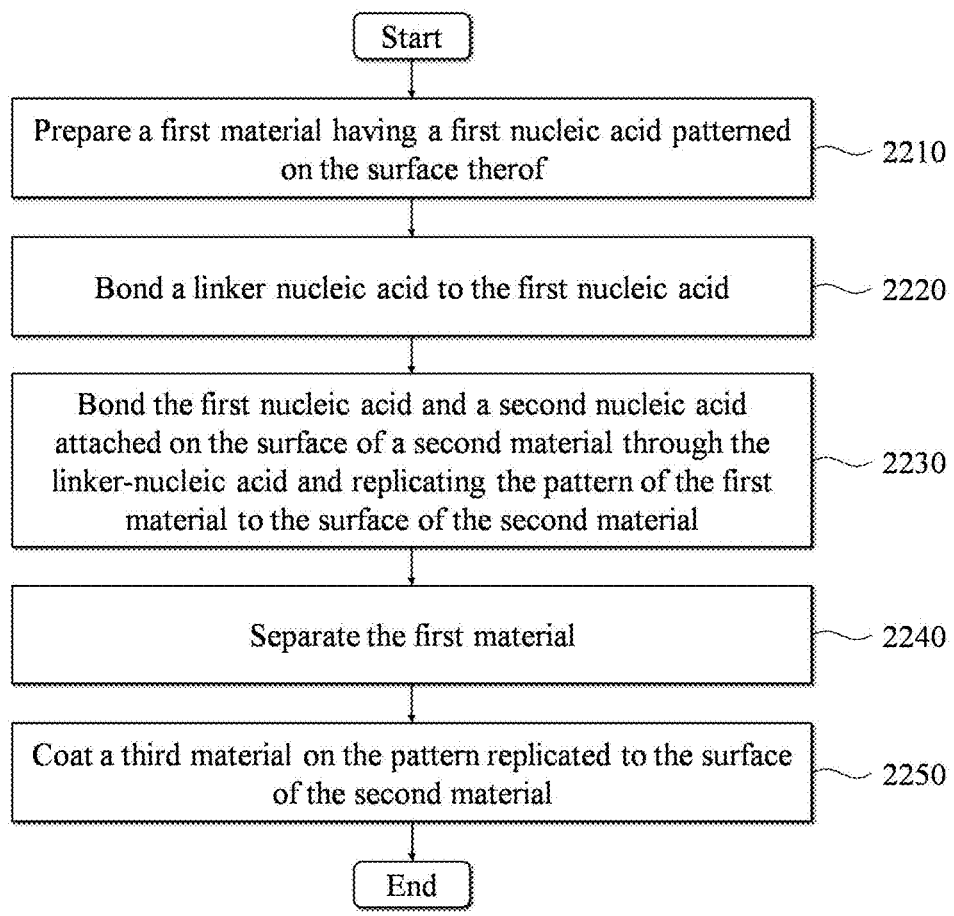

NUCLEIC ACID-MEDIATED PATTERN REPLICATION AND METHOD OF MANUFACTURING 2-D MATERIAL USING THE SAME

CROSS-REFERENCES TO RELATED APPLICATIONS

This application is based on and claims priority under 35 U.S.C. 119 to Korean Patent Application No. 10-2020-0139928, filed on Oct. 27, 2020, and Korean Patent Application No. 10-2021-0095105, filed on Jul. 20, 2021, in the Korean intellectual property office, the disclosures of which are herein incorporated by reference in their entireties.

TECHNICAL FIELD

The following description relates to the nucleic acid-mediated pattern replication and a method of manufacturing a two-dimensional (2-D) material using the same.

BACKGROUND OF THE INVENTION

A contact-based patterning technology used to manufacture a structure having a micrometer to nanometer resolution includes nanoimprint lithography, dip-pen nanolithography, microcontact printing, etc. In such an existing technology, in general, only one type of material can be patterned in one process. Accordingly, in order to manufacture a substrate in which several different types of materials are complexly patterned, a process needs to be inevitably repeated. Furthermore, there is a difficulty in that the manufacturing time and the complexity of a process are increased in proportion to the number of patterning materials, such as that the substrates must be accurately arranged whenever the process is repeated.

Furthermore, in the case of microcontact printing and nanoimprint lithography, that is, contact-based patterning technologies, only one pattern can be repeatedly formed per one mold (or stamp). In order to form several different patterns, a mold for each of the patterns must be manufactured.

Furthermore, a process, such as the existing photolithography, cannot be applied to a substrate that has a curved surface or is soft. In the case of soft lithography technology, including nanoimprint lithography, the type of resist materials (e.g., thermoplastic and thermosetting polymers or an ultraviolet photocurable material) and substrates on which a pattern can be formed is limited.

Furthermore, in most micro/nanopatterning technologies, a pattern can be transferred to only a hard surface. Furthermore, the resolution of a pattern produced as described above is limited by the resolution of the original pattern and the resolution of the process.

Prior Art Document

Japanese Patent Application Publication No. 2015-008308

SUMMARY

This summary is provided to introduce a selection of concepts in a simplified form that is further described below in the Detailed Description. This summary is not intended to identify key features of the claimed subject matter, nor is it intended to be used as an aid in determining the scope of the claimed subject matter.

Embodiments provide a method of manufacturing a 2-D material, which is capable of multi-patterning through a single process.

Embodiments provide a method of manufacturing a 2-D material, which is capable of selective and/or continuous replication of the original pattern.

Embodiments provide a method of manufacturing a 2-D material, which is capable of high-resolution patterning based on single-molecular contact.

Embodiments provide a method of manufacturing a 2-D material which may be applied to various patterning materials and substrates.

Embodiments provide a method of manufacturing a 2-D material, which is capable of achieving resolution higher than that of the original pattern.

According to various embodiments, a method of manufacturing a two-dimensional (2-D) material includes preparing a first material having a first nucleic acid patterned on a surface thereof, bonding a linker-nucleic acid to the first nucleic acid, replicating a pattern of the first material to the surface of the second material by bonding the first nucleic acid and a second nucleic acid on the second material through the linker-nucleic acid, separating the first material, and applying a third material on the pattern replicated to the surface of the second material.

According to an aspect, preparing a first material may include marking target materials or molecules on a surface of the first material with the first nucleic acid having a first sequence.

According to another aspect, the linker-nucleic acid may have a structure in which a third nucleic acid and a fourth nucleic acid are connected by a short inter-nucleic acid linker nucleic acid. Third nucleic acid has a second sequence complementary to the first sequence of the first nucleic acid. Fourth nucleic acid has a fourth sequence complementary to the third sequence of the second nucleic acid.

According to still another aspect, bonding the first nucleic acid and the linker-nucleic acid may include inducing complementary base pairing between the first sequence of the first nucleic acid and the second sequence of the third nucleic acid included in the linker-nucleic acid.

According to still another aspect, replicating a pattern of the first material may include replicating the pattern (e.g., location information of individual materials or target molecules) of the first material to the surface of the second material by bonding the fourth nucleic acid, having the fourth sequence and included in the linker-nucleic acid, and the second nucleic acid having the third sequence through physical contact between the surface of the first material and the surface of the second material.

According to still another aspect, separating the first material may include cutting a inter-nucleic acid linker of the linker-nucleic acid, or cutting a bond between the first material and the second material by using an enzyme or a chemical reaction which recognizes and cuts a specific sequence of a double-strand nucleic acid formed by the hybridization between the first nucleic acid and the third nucleic acid or between the second nucleic acid and the fourth nucleic acid.

According to still another aspect, separating the first material may include dehybridizing the first nucleic acid and the third nucleic acid while the hybridization between the second nucleic acid and the fourth nucleic acid has been maintained based on a difference in the bonding strength between the nucleic acids.

According to still another aspect, the third material may include at least one of metals, polymers, ceramics, biomolecules, and cells each functionalized with the first nucleic acid having the first sequence or a new nucleic acid containing the first sequence, or single molecules functionalized with the first nucleic acid having the first sequence or the new nucleic acid containing the first sequence.

According to still another aspect, the third material may include a material identical with a material of target materials or molecules on the surface of the first material.

According to still another aspect, the third material may include a material different from a material of target materials or molecules on the surface of the first material.

According to still another aspect, in applying a third material on the replicated pattern, the third material is bonded to the linker-nucleic acid remained on the surface of the second material as a surface of the third material is modified by the first nucleic acid having a first sequence or a new nucleic acid containing the first sequence.

According to still another aspect, preparing a first material may include preparing the first material including a plurality of patterns. Two or more of the plurality of patterns may include nucleic acids having orthogonal sequences. The first nucleic acid may be one of the nucleic acids having orthogonal sequences. Bonding the first nucleic acid and a second nucleic acid may include bonding nucleic acids included in the plurality of patterns and a plurality of linker-nucleic acids including different nucleic acids. The different linker-nucleic acids may include nucleic acids having sequences complementary to the nucleic acids having the orthogonal sequences, respectively.

According to still another aspect, replicating a pattern of the first material may include replicating the plurality of patterns of the first material to the surface of the second material by physically bringing the first material into contact with the surface of the second material, and the surface of the second material is modified by multiple nucleic acids corresponding to each of the nucleic acids having the orthogonal sequences.

According to still another aspect, applying a third material on a pattern may include applying, on the pattern replicated to the surface of the second material, a plurality of different third materials functionalized with nucleic acids having orthogonal sequences, respectively.

According to still another aspect, preparing a first material may include preparing the first material including N (the N is a natural number) patterns. Nucleic acids constituting different patterns may be orthogonal to each other. 2 or more to M (the M is $2^N-1$) or fewer types of patterns may be formed by reusing the separated first material.

According to still another aspect, when the first material is reused, a plurality of linker-nucleic acids bonded to nucleic acids included in the N patterns may include nucleic acids having (N−1) or fewer types of different sequences. According to still another aspect, the second material may include a soft material. The method may further include a first step of contracting a soft material to which the pattern has been replicated, a second step of replicating the pattern to another second material by using the contracted soft material as the first material again, and a third step of repeating the first step and the second step A times (the A is a natural number).

According to various embodiments, a two-dimensional (2-D) material includes the pattern replicated from a surface of original material to a surface of the 2-D material via nucleic acid-mediated pattern replication, a second nucleic acid attached to the surface of the 2-D material, a linker-nucleic acid connecting the first nucleic acid and the second nucleic acid, and an additional material applied on the surface of the 2-D material and bonded to the linker-nucleic acid of the pattern.

Furthermore, a method of manufacturing a 2-D material, which is capable of multi-patterning through a single process, can be provided.

Furthermore, a method of manufacturing a 2-D material, which is capable of selective and/or continuous replication of the original pattern, can be provided.

Furthermore, a method of manufacturing a 2-D material, which is capable of high-resolution patterning based on single-molecular contact, can be provided.

Furthermore, a method of manufacturing a 2-D material which may be applied to various patterning materials and substrates can be provided.

Furthermore, a method of manufacturing a 2-D material, which is capable of achieving resolution higher than that of the original pattern, can be provided.

DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 1 to 6 are diagrams illustrating examples of a method of manufacturing a 2-D material according to an embodiment of the present disclosure.

FIG. 11 is a diagram illustrating an example in which the original pattern of hydrogel is replicated to a surface of another hydrogel through the interaction between complementary nucleic acids (i.e., base-pairing) in an embodiment of the present disclosure.

FIGS. 12 to 15 are diagrams illustrating examples in which pattern replication using nucleic acids was experimentally implemented in an embodiment of the present disclosure.

FIGS. 16 to 18 are diagrams illustrating examples in which a distribution of biomolecules on a surface of tissue was replicated to a surface of new material in an embodiment of the present disclosure.

FIGS. 20 and 21 are diagrams illustrating examples in which the resolution of a replicated pattern was improved using a shrinkable hydrogel in an embodiment of the present disclosure.

FIG. 22 is a flowchart illustrating an example of a method of manufacturing a 2-D material according to an embodiment of the present disclosure.

DETAILED DESCRIPTION

Figure 1:
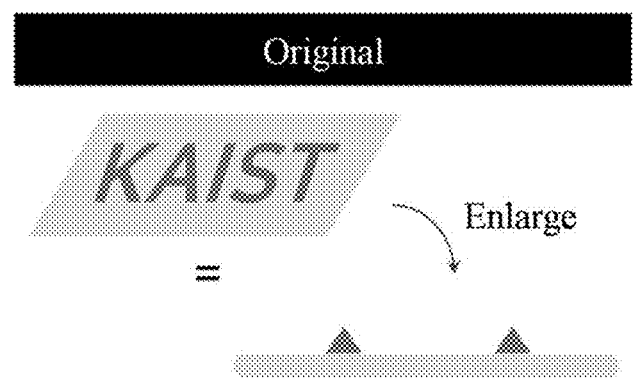

While illustrative embodiments have been illustrated and described, it will be appreciated that various changes can be made therein without departing from the spirit and scope of the invention.

Specific structural or functional descriptions of embodiments have been merely illustrated for the purpose of examples, and embodiments may be changed and implemented in various forms. Accordingly, an actually implemented form is not limited to only a specific embodiment, and the scope of this specification includes changes, equivalents or substitutes included in the technical scope of the present disclosure.

Terms, such as a "first" and a "second", may be used to describe various components, but it should be interpreted that such terms are only used to distinguish one component from the other component. For example, a first component may be named a second component. Likewise, a second component may be named a first component.

When it is said that one component is "connected" to the other component, it should be understood that one component may be directly connected or coupled to the other component, but a third component may exist between the two components.

An expression of the singular number includes plural expressions unless evidently expressed otherwise in the context. In this specification, a term, such as "include" or "have", should be understood to indicate the existence of a characteristic, number, step, operation, component, part, or a combination of them described in the specification and not to exclude the existence or the possibility of the addition of one or more other characteristics, numbers, steps, operations, components, parts or a combination of them.

All terms used herein, including technical or scientific terms, have the same meanings as those commonly understood by a person having ordinary knowledge in a corresponding technology field, unless defined otherwise in the specification. Terms, such as those commonly used and defined in dictionaries, should be construed as having the same meanings as those in the context of a related technology, and are not construed as being ideal or excessively formal unless explicitly defined otherwise in the specification.

Hereinafter, embodiments are described in detail with reference to the accompanying drawings.

Embodiments of the present disclosure provide a technology for replicating, on a surface of another material, a chemical pattern on a surface of the original material through the specific interaction between two nucleic acid strands having complementary sequences, as a two-dimensional (2-D) pattern replication and material manufacturing technology. In this case, all types of known nucleic acids or their analogs, that can generate unique sequences at the molecular level and strongly interact between only specific sequences, may be used. The most representative example is DNA, and includes RNA, and a locked nucleic acid (LNA), a peptide nucleic acid (PNA), etc., that is, modified types of nucleic acids. As described above, all substances that strongly interact between only specific sequences along with "DNA, RNA, LNA, PNA" may be used as the nucleic acids. Furthermore, there can be provided a technology capable of easily manufacturing a complicated 2-D material through only one process by precisely placing various materials (e.g., cells, single molecules, nanoparticles, metals, polymers, ceramics, biomolecules) on a pattern replicated as described above. Furthermore, metals, polymers, ceramics, biomolecules, etc., may be attached to such materials or single molecules or may be grown from the materials or single molecules. In a method of manufacturing a 2-D material according to an embodiment, a 2-D material can be manufactured using an interaction between nucleic acid strands. The main idea is to develop a contact-based 2-D patterning technology using a specific interaction between two nucleic acid strands having complementary sequences.

FIGS. 1 to 6 are diagrams illustrating examples of a method of manufacturing a 2-D material according to an embodiment of the present disclosure. The method of manufacturing a 2-D material according to embodiments of FIGS. 1 to 6 illustrates an example in which a pattern on a surface is replicated using nucleic acids and a 2-D material is manufactured using the pattern. The embodiment of FIGS. 1 to 6 illustrates an example in which a single type of pattern that is simplest and may be implemented is replicated. In order to help understanding, the size of a nucleic acid has been enlarged and illustrated. A real nucleic acid is several nanometers or less in length and is much smaller than new materials (or substrates) or pattering material on which a pattern is replicated. The replication of a pattern using nucleic acids and a method of manufacturing a 2-D material using a replicated pattern may basically include four steps.

Figure 2:
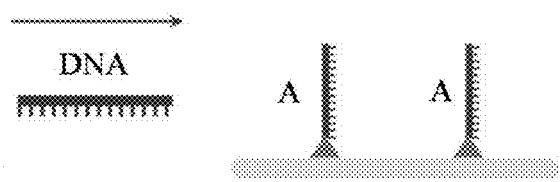

First, FIG. 1 illustrates that the original material having target materials or target molecules to be replicated patterned on a surface. FIG. 2 is a target pattern labeling step, and illustrates a process of particularly labeling target materials or target molecules on a surface of the original material as a nucleic acid having a specific sequence "A." Alternatively, all types of materials (e.g., commercialized DNA chips or tissue slices on which specific protein has been labeled by a nucleic acid) having surfaces functionalized with nucleic acids may be used as the original.

Figure 3:
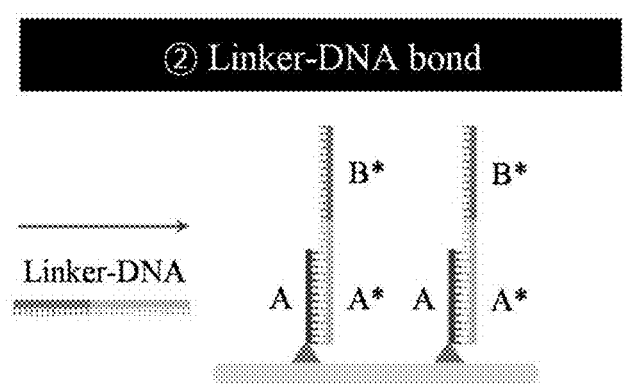

FIG. 3 is a linker-nucleic acid bonding step through the nucleic acid hybridization, and illustrates a process of bonding, to the specific sequence A (first nucleic acid having a first sequence), a linker-nucleic acid having a complementary sequence A* (third nucleic acid having a second sequence). The linker-nucleic acid has a sequence B* (fourth nucleic acid having a fourth sequence) at an end thereof on the opposite side thereof.

FIG. 4 is a pattern transfer step, and illustrates a process of physically bringing the sequence B* at the end of the linker-nucleic acid into contact with a surface of another material functionalized with a nucleic acid having a complementary sequence B (second nucleic acid having a third sequence). As a result, the location information (or pattern) of a target molecule on a surface of the original material may be delivered in the form of an "a nucleic acid of the pattern on the original surface-linker-nucleic acid-a nucleic acid on the new surface" complex through the specific interactions between A-A* and B-B*. Thereafter, the surface of the original material is separated.

In this case, at least one of the surface of the original material and a surface of another material on which a pattern will be transferred may be a hydrogel (or a soft surface material). If both the original material and another material on which replication will be performed are hard surface materials, replication may not operate. In this case, a method of replicating a pattern of hard surface material to a hydrogel (or a soft surface material) and replicating the pattern on a hydrogel (or a soft surface material) to another hard surface material may be used.

Figure 5:
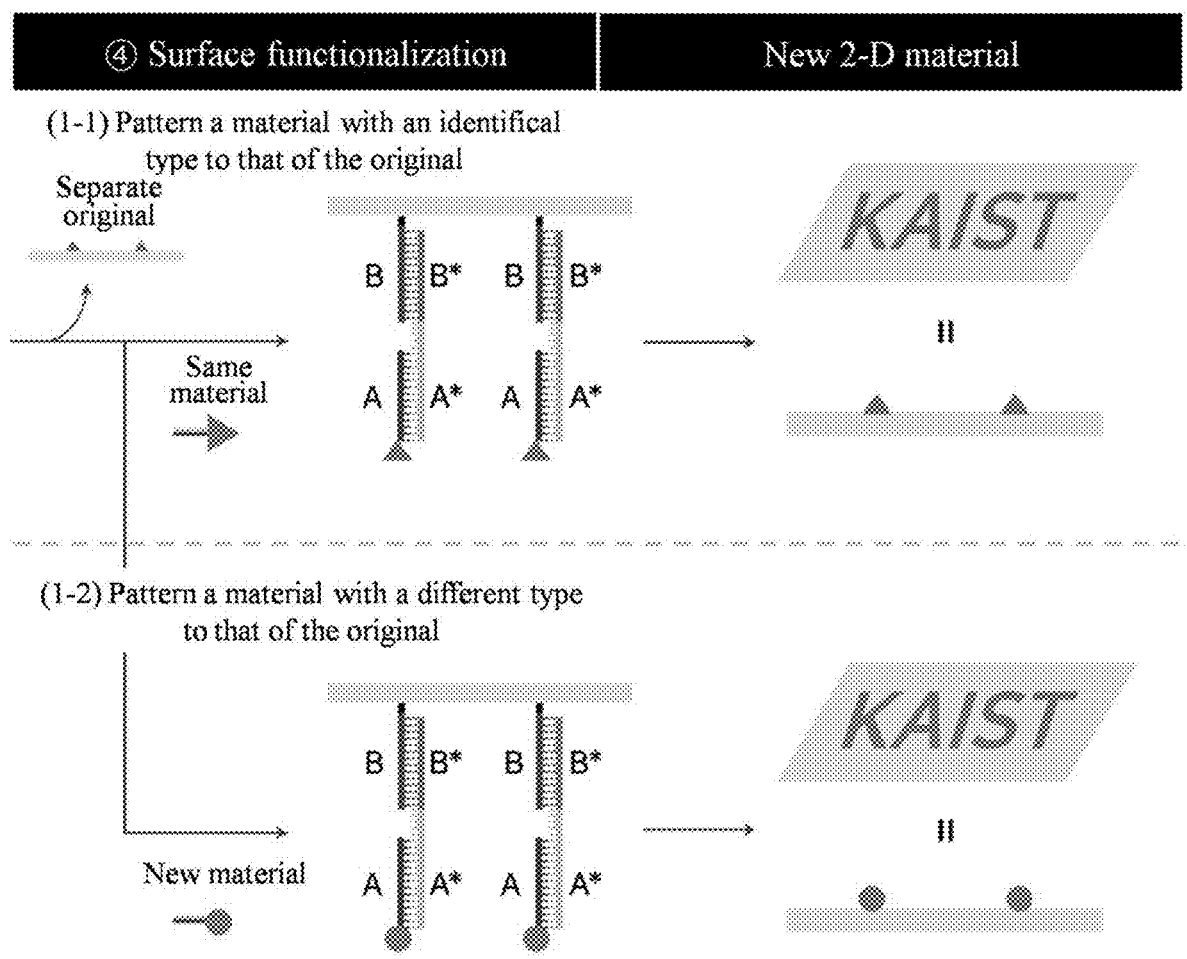
Figure 6:
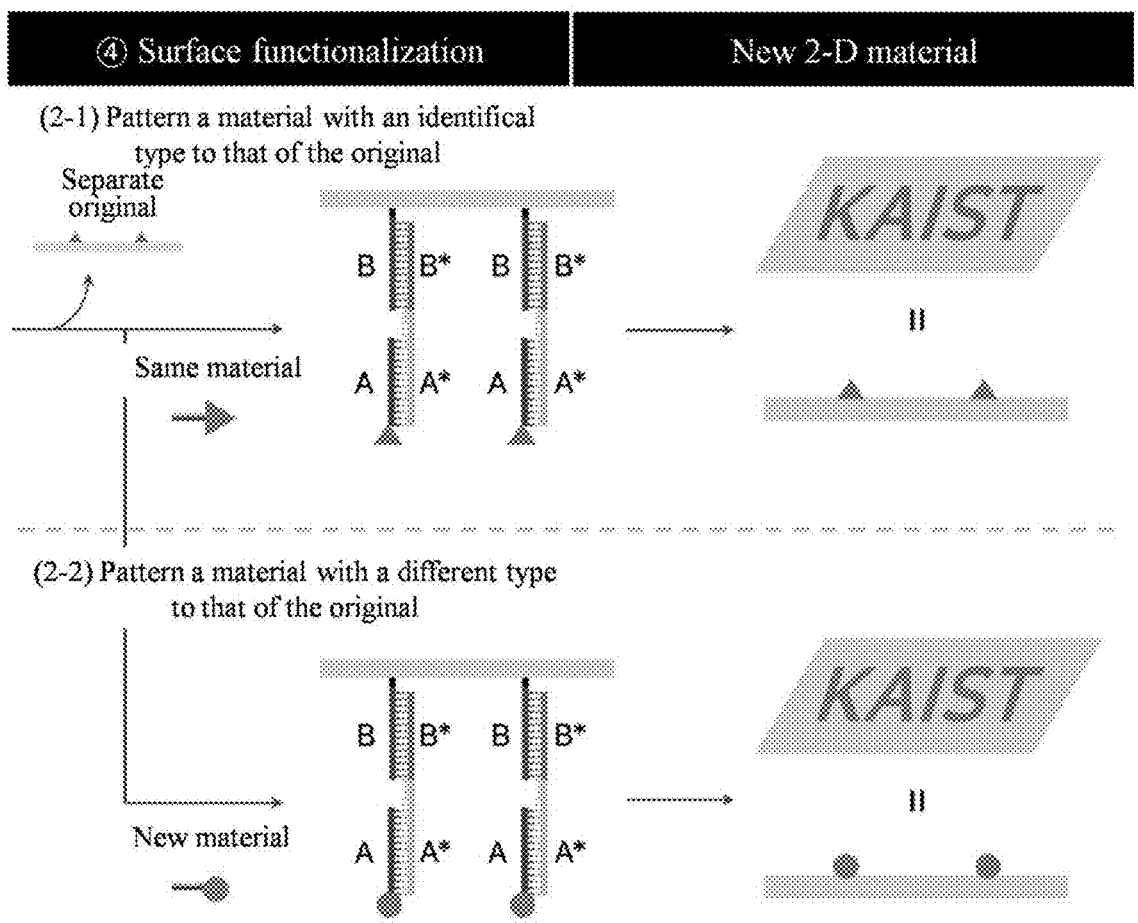

FIGS. 5 and 6 correspond to a surface functionalization step and illustrate an example of a process of applying, on a replicated pattern, materials (e.g., single-molecules, metals, polymers, ceramics, biomolecules, cells, or nanoparticles) functionalized with a nucleic acid including a sequence A. In this case, if target materials or target molecules are placed again, the original materials can be replicated without any change ((1-1) in FIGS. 5 and (2-1) in FIG. 6). If a different type of materials or molecules is applied, a 2-D material having the same distribution (or pattern), but patterned with new materials or molecules may be obtained ((1-2) in FIGS. 5 and (2-2) in FIG. 6). In this case, the second substrate to which the pattern has been replicated may be the same material as the original (FIG. 5) or may be different materials (FIG. 6).

Furthermore, according to embodiments of the present disclosure, complicated 2-D materials including one or more materials, which was impossible using the existing 2-D material technologies, can be easily manufactured using multiple orthogonal nucleic acid pairs. In particular, complicated patterns can be simultaneously replicated on a surface of new material without restriction to a type or the number of kinds. Furthermore, although the original material has one or more types of complex patterns, only desired patterns can be selectively replicated.

In the method of manufacturing a 2-D material according to an embodiment, complicated patterns can be simultaneously replicated using orthogonal nucleic acid pairs.

Figure 7:
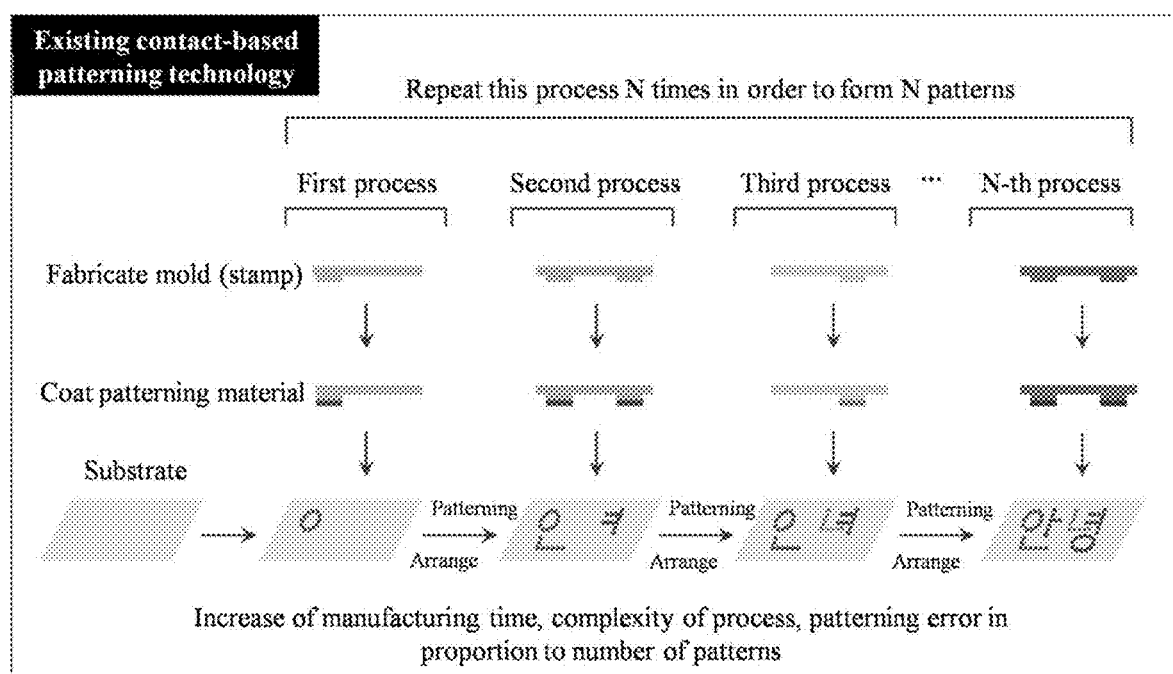
FIG. 7 is a diagram illustrating an example of the existing contact-based patterning technology.
Figure 8:
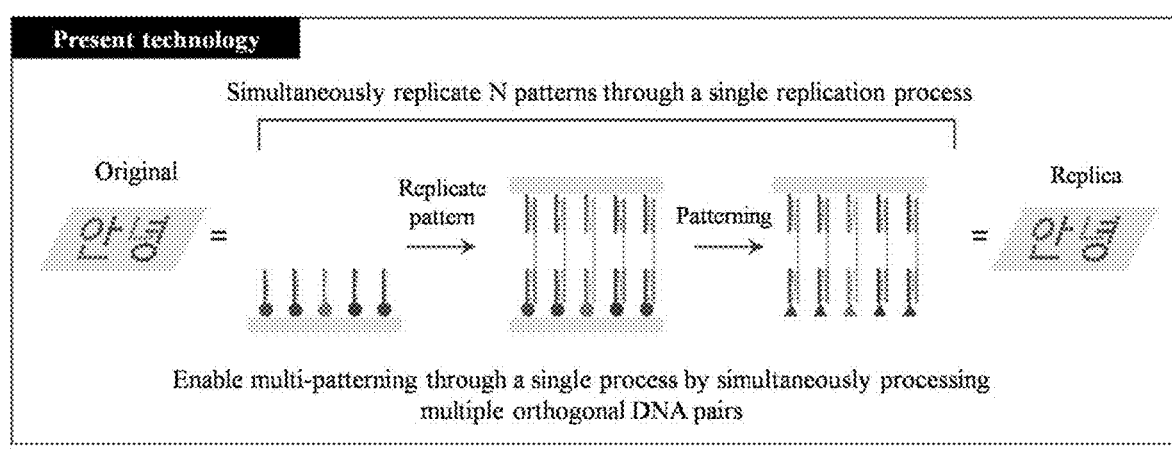
FIG. 8 is a diagram illustrating an example in which complicated patterns including a plurality of materials or a plurality of single molecules are replicated in a single step by using orthogonal nucleic acid pairs in an embodiment of the present disclosure.

FIG. 7 is a diagram illustrating an example of the existing contact-based patterning technology. FIG. 8 is a diagram illustrating an example in which complicated patterns are replicated in a single step by using orthogonal nucleic acid pairs in an embodiment of the present disclosure.

In the method of manufacturing a 2-D material according to an embodiment of the present disclosure, a pattern may be replicated based on an interaction between complementary nucleic acid strands (commonly known as base pairing). One pair of nucleic acids may replicate one type of patterns. Since only complementary nucleic acid strands can particularly interact with each other, several pairs of orthogonal (=not complementary) nucleic acids may be used to replicate and pattern different patterns by simultaneously processing the several pairs of orthogonal nucleic acids.

For example, if a nucleic acid having 20 bases is used, $4^{20}=1,099,511,627,776$ (about 1 trillion) nucleic acid strands may be used. This corresponds to 500 billion orthogonal nucleic acid pairs. In other words, different 500 billion patterns can be simultaneously replicated and patterned.

Accordingly, if embodiments of the present disclosure are used, there are advantages in that multi-patterning can be easily performed without a complicated process of repeating the same process, and the number of different patterns which may be transferred is not limited.

Furthermore, in the method of manufacturing a 2-D material according to an embodiment, different patterns can be selectively replicated from a single original pattern.

Figure 9:
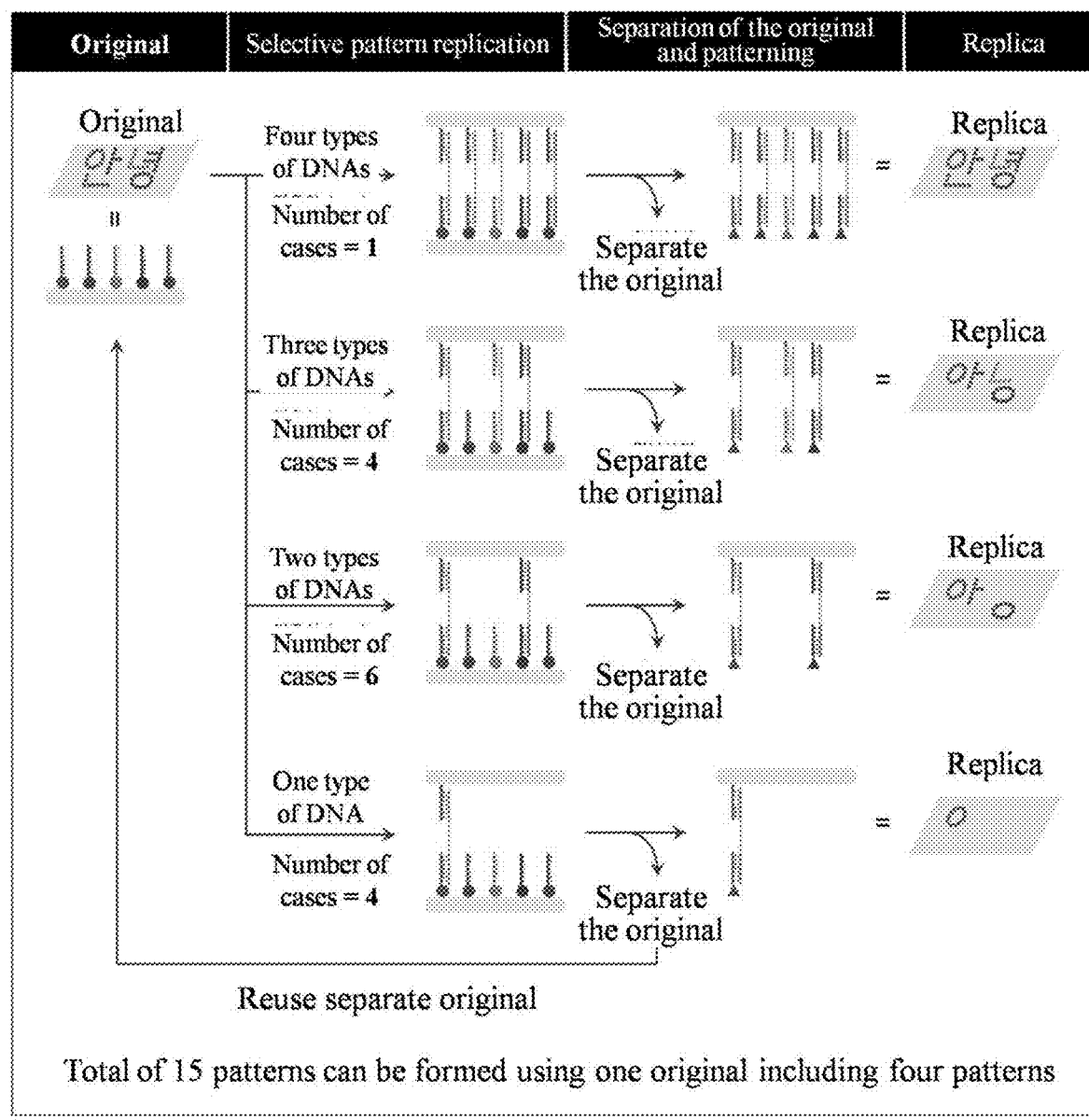
FIG. 9 is a diagram illustrating an example in which different combinations of patterns are replicated from one original pattern in an embodiment of the present disclosure.

FIG. 9 is a diagram illustrating an example in which different combinations of patterns are replicated from one original pattern in an embodiment of the present disclosure. In the method of manufacturing a 2-D material according to the present embodiment, only some of the different patterns of the original surface may be replicated or may be selectively combined and replicated using different nucleic acid pairs. For example, if the original includes different four types of patterns, the four patterns may be replicated as a single (the number of cases=4), two of the four patterns may be combined (the number of cases=6), three of the four patterns may be combined (the number of cases=4), or all the four patterns may be replicated (the number of cases=1). Accordingly, a total of 15 different patterns can be replicated from the one original pattern.

Furthermore, according to embodiments of the present disclosure, a pattern can be easily replicated to a surface of a soft material, such as a hydrogel, which had limitations using the existing method of manufacturing a 2-D material. If pattern replication and hydrogel shrinking are repeated by applying such replication, the resolution of a pattern can be significantly improved. In other words, in the method of manufacturing a 2-D material according to an embodiment, resolution can be improved through repetitive pattern replication and hydrogel shrinking.

Figure 10:
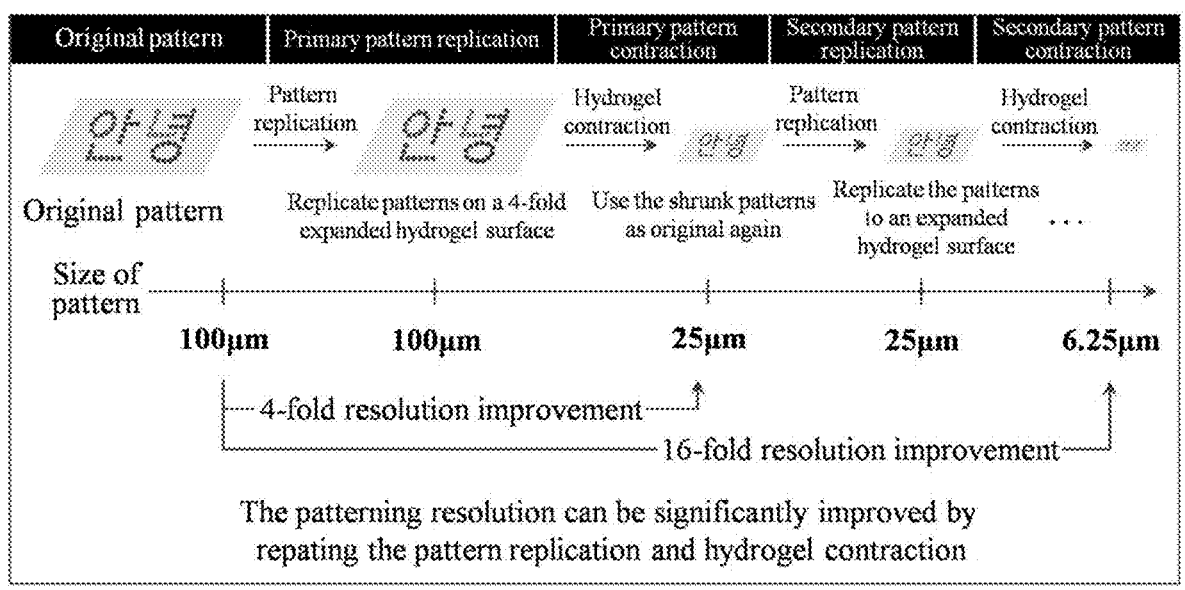
FIG. 10 is a diagram illustrating an example in which patterning resolution is improved through repetitive replication to soft material and the shrinking of a soft material in an embodiment of the present disclosure.
Figure 13:
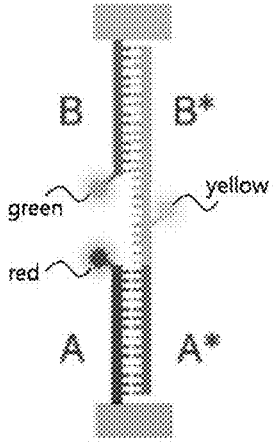
Figure 14:
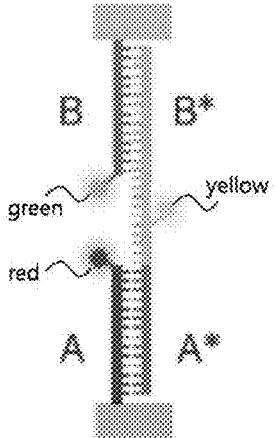
Figure 15:
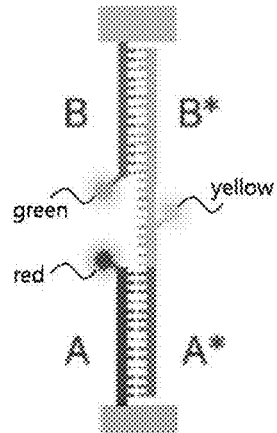

FIG. 10 is a diagram illustrating an example in which patterning resolution is improved through repetitive replication and hydrogel shrinking in an embodiment of the present disclosure. One of the advantages of the method of manufacturing a 2-D material according to the present embodiment is that there is no limitation to a new material to which a pattern can be replicated. In particular, unlike the existing technologies, the method of manufacturing a 2-D material according to the present embodiment may also be applied to soft materials, such as a hydrogel. If a shrinkable hydrogel is used, high resolution can be achieved by the isotropic shrinking of the transferred pattern.

To this end, in the method of manufacturing a 2-D material according to the present embodiment, a process of replicating the original pattern to a surface of a hydrogel (e.g., poly(sodium acrylate) hydrogel) expanded four-fold, shrinking the hydrogel, transferring the shrunk pattern to a surface of another expanded hydrogel, and shrinking the second hydrogel again may be performed. As described above, whenever pattern replication and hydrogel shrinking are repeated once, the size of the pattern is reduced by four-folds. If this process is repeated N times, the resolution is improved to a maximum of 4N folds. Accordingly, patterning having a much higher resolution than that of the original pattern can be performed. For example, if the original pattern having a 100 micrometer or nanometer resolution is produced and contracted, a pattern having about a 1.5 micrometer or nanometer resolution can be obtained.

In patterning technologies, as the size of a pattern is reduced, the complexity of a process is increased, and thus a patterning time and cost are exponentially increased. In contrast, if the method of manufacturing a 2-D material according to the present embodiment is used, the original pattern can be produced to have a size which can be relatively easily patterned. A pattern having several nanometer resolutions, which cannot be achieved using the existing patterning technologies, can be formed by replicating and contracting the original pattern. Accordingly, the time and cost necessary to achieve a patterning resolution having a similar level can be significantly reduced.

As described above, embodiments of the present disclosure have a differentiated advantage in that they can complexly overcome patterning efficiency and resolution problems, the complexity of a limited pattern, limitations to the limited applicability of a hard material, etc., in the existing 2-D material technology.

More specifically, the method of manufacturing a 2-D material according to embodiments of the present disclosure enables multi-patterning through a single process. Contact-based patterning technologies used to manufacture a micro/nanostructure include nanoimprint lithography, dip-pen nanolithography, microcontact printing, etc. In such an existing technology, only one type of material can be patterned through one process. In order to manufacture a substrate on which several types of materials have been complexly patterned, a process inevitably needs to be repeated. Furthermore, there is a difficulty in that the manufacturing time and the complexity of a process are increased in proportion to the number of pattering materials, such as that the substrate must be precisely rearranged, whenever the process is repeated. In contrast, in the method of manufacturing a 2-D material according to embodiments of the present disclosure, the replication of a pattern is performed through the highly specific interaction based on base complementarity. Accordingly, if orthogonal nucleic acid pairs are used, there are advantages in that multiple types of patterns can be simultaneously replicated through one process and the type and the number of molecules which may be replicated are not limited.

Furthermore, in the method of manufacturing a 2-D material according to embodiments of the present disclosure, the original pattern can be selectively and/or continuously replicated. For example, a pattern of a first material surface may be copied multiple times to a surface of another material to make multiple copies of one master pattern. As another example, the pattern of the first material surface may be copied to the second material surface, and the copied pattern of the second material surface may be copied to the third material surface to make a copy of the copy. In the case of microcontact printing, nanoimprint lithography, etc., that is, contact-based patterning technologies, only one pattern can be repeatedly formed per one mold (or stamp). In order to form several different patterns, molds for respective patterns need to be manufactured. In contrast, in the method of manufacturing a 2-D material according to embodiments of the present disclosure, each pattern can be selectively combined and replicated from one complicated original pattern. The original separated after pattern replication can be reused. Accordingly, the time and cost necessary to form multiple patterns in the existing technology can be significantly reduced.

Furthermore, the method of manufacturing a 2-D material according to embodiments of the present disclosure enables high-resolution patterning based on a single molecule contact. Resolution of the method of manufacturing a 2-D material according to embodiments of the present disclosure is determined by physical factors, such as the length of a linker-nucleic acid and the density of nucleic acids functionalized on a replication surface. A pattern of the original surface may be transferred through single-molecular contact. Transfer through such molecular contact enables more elaborate replication than photolithography which is limited by the optical diffraction limit.

Furthermore, various patterning materials and substrates may be applied to the method of manufacturing a 2-D material according to embodiments of the present disclosure. A process, such as the existing photolithography, cannot be applied to a substrate that has a curved surface or is soft. A soft lithography technology, such as nanoimprint lithography, has a limited type of resist materials (e.g., thermoplastic and thermosetting polymers and an ultraviolet photocurable material) and substrates on which a pattern may be formed. In contrast, in the method of manufacturing a 2-D material according to embodiments of the present disclosure, any material having a surface functionalized with nucleic acids may be used as a substrate. Likewise, any material to which a nucleic acid may be connected may be applied as a patterning material. The manufacturing of a biochip, a sensor, etc. using nucleic acid is already widely used. If a surface functionalization and conjugation technology using an already widely known nucleic acid is used, a wide variety of materials or molecules, such as metals, polymers, glass, ceramics, and biological specimens, can be applied to the present technology.

Furthermore, the method of manufacturing a 2-D material according to embodiments of the present disclosure can achieve higher resolution than that of the original pattern. In most micro/nanopatterning technologies, a pattern may be transferred to only a substrate made of hard material. Furthermore, the resolution of a pattern produced as described above has limitations due to the resolution of the original pattern and resolution of the replication process. In contrast, in the method of manufacturing a 2-D material according to embodiments of the present disclosure, patterning for a substrate made of a soft material, such as a hydrogel, is possible. If a master pattern is replicated to a hydrogel which can be shrunk and iterative hydrogel shrinking is performed by applying such a method, a pattern that is smaller and more elaborate than the original pattern can be formed.

Ideas of embodiments of the present disclosure were successfully experimentally implemented. Additionally, the possibility of manufacturing various 2-D materials using the ideas was verified. Furthermore, it was verified that the most useful and differentiated application method of embodiments of the present disclosure can be used to manufacture an artificial tissue mimic by replicating a protein pattern on a surface of biological tissue, so that it can be commercialized as a business model having strong competitiveness in the future.

Major Results 1: Implementation of Pattern Replication by Applying Embodiments of the Present Disclosure It was confirmed that the nucleic acid-mediated pattern transfer could be well implemented and effectively operated by transferring a shape of the original hydrogel having a polygon shape to a surface of new material without any change according to embodiments of the present disclosure.

Figure 11:
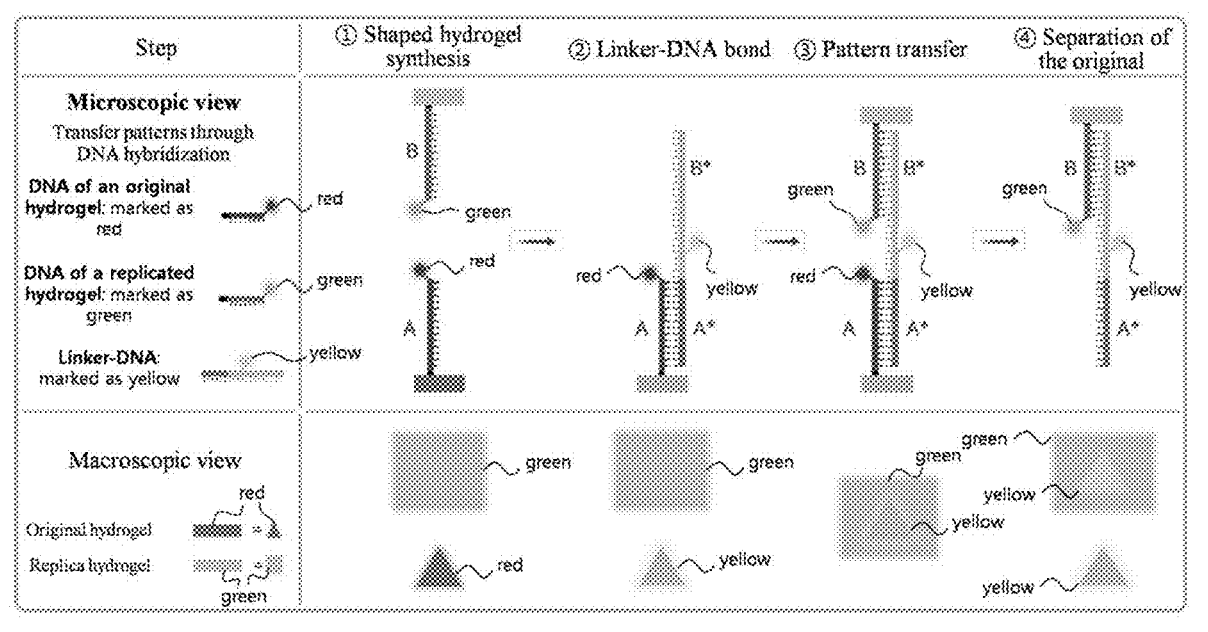

FIG. 11 is a diagram illustrating an example in which the original pattern of a hydrogel is replicated to a surface of another hydrogel through the interaction between complementary nucleic acids in an embodiment of the present disclosure. Referring to FIG. 11, a nucleic acid A of a specific sequence present on a surface of a triangular original hydrogel. Another nucleic acid B presents on a surface of a new hydrogel to which the pattern will be replicated. If a linker-nucleic acid having a sequence A* (complementary to A) and a sequence B* (complementary to B) is bonded to the nucleic acid A of the original hydrogel and the new hydrogel is brought into contact with the nucleic acid A, B* at the end on the opposite side of the linker-nucleic acid and another nucleic acid B on the surface of new hydrogel surface complementarily interact with each other. When the two hydrogels are physically are detached, the original pattern of hydrogel having a triangular shape is replicated to the surface of the replicated hydrogel.

Furthermore, in an embodiment of the present disclosure, a linker-nucleic acid included a control group using, as a replica, a hydrogel functionalized with a nucleic acid that is not complementary. It was found that a pattern was not transferred in the corresponding experiment group. Accordingly, it was found that the replication of a pattern was performed by specific interaction between two complementary nucleic acid strands.

FIGS. 12 to 15 are diagrams illustrating examples in which pattern replication using nucleic acids was experimentally implemented in an embodiment of the present disclosure. It was found that a pattern was not transferred if a non-complementary nucleic acid was used in a control group (refer to FIG. 15). It was found that pattern transfer was performed by only a specific interaction between complementary nucleic acid strands. In this case, a scale bar was 1 mm.

Major Results 2: Replication of a Protein Pattern on a Surface of a Mouse Brain Slice to A Surface of A New Material If embodiments of the present disclosure are used, biological tissue can be used as the original (or a mold or a master). A pattern of a specific biomolecule on a surface of tissue can be replicated to a surface of another material without any change.

Figure 17:
Figure 18:

FIGS. 16 to 18 are diagrams illustrating examples in which a distribution of biomolecules on a surface of tissue was replicated to a surface of new material in an embodiment of the present disclosure. After a target protein is selectively labeled by a nucleic acid-conjugated antibody, if the method of manufacturing a 2-D material according to embodiments of the present disclosure is applied, a pattern of the target protein may be replicated to a surface of hydrogel, that is, a new material, without any change. In this case, a scale bar=1 mm.

In the present embodiment, after a specific protein (NeuN) strongly expressed in the hippocampus of a mouse brain slice was immunolabeled, the expression pattern of the protein was transferred to a surface of a new hydrogel by using the nucleic acid-mediated pattern transfer method. Characteristic patterns (CA1, CA2, CA3, and DG areas) of the hippocampus were clearly transferred.

Figure 19:
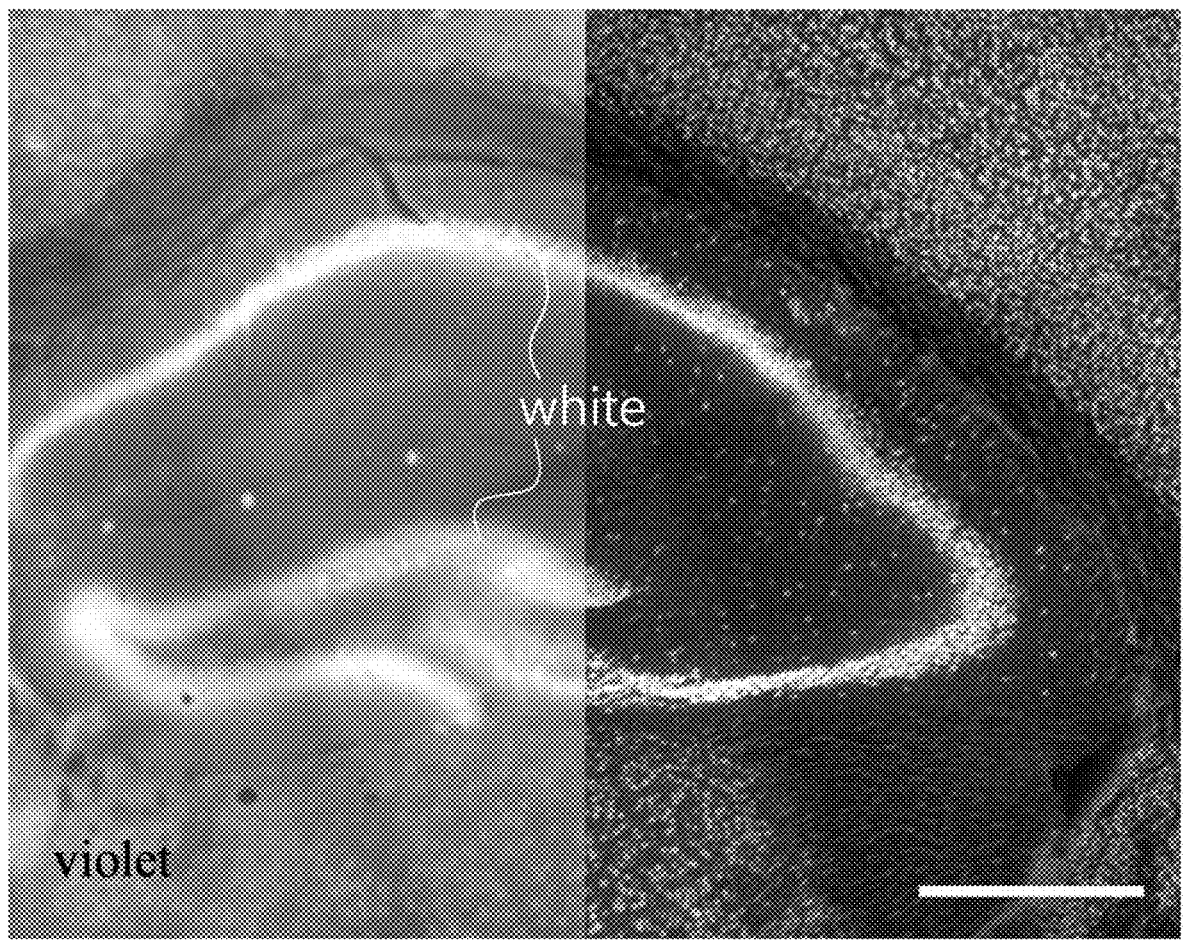
FIG. 19 is a diagram illustrating an example in which a pattern of a protein expressed in a neuronal cell in the mouse brain was replicated to a surface of a hydrogel in an embodiment of the present disclosure.

FIG. 19 is a diagram illustrating an example in which a pattern of NeuN expression in a mouse brain was replicated to a surface of hydrogel in an embodiment of the present disclosure. In FIG. 19, the left side illustrates an expression pattern (white) of the target protein transferred on replicated nucleic acid-hydrogel (violet). The right side illustrates a shape (white) in which the target protein on a surface of the original brain slice (black) was particularly dyed. In this case, a scale bar=1 mm.

Major Results 3: Improvement of the Resolution of a Replicated Pattern Through Hydrogel Shrinking After a pattern is transferred to an expandable and/or shrinkable hydrogel by using a nucleic acid, the resolution of the pattern can be improved by shrinking the hydrogel.

Figure 20:
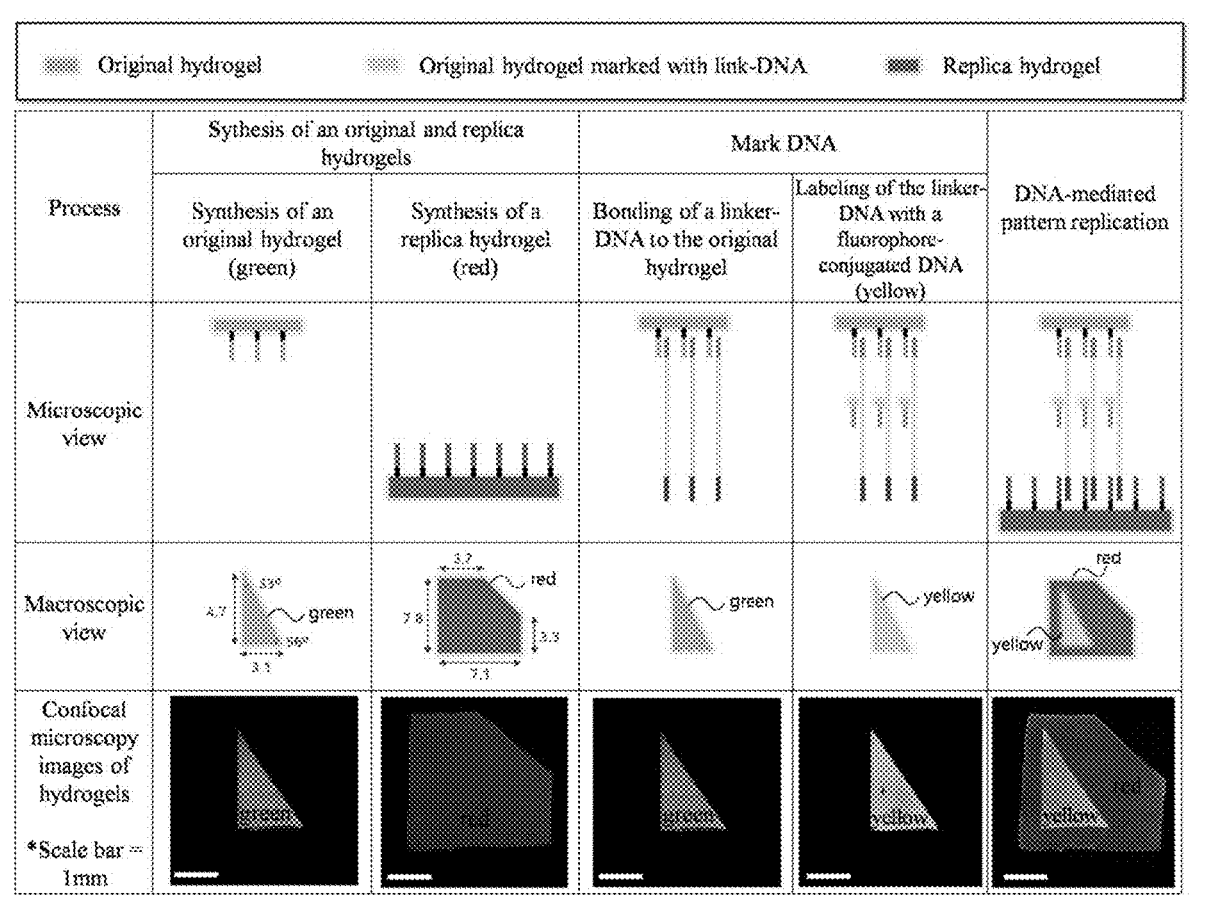
Figure 21:

FIGS. 20 and 21 are diagrams illustrating examples in which the resolution of a replicated pattern was improved using a shrinkable hydrogel in an embodiment of the present disclosure. After a pattern having a triangular shape was replicated to a surface of new hydrogel, a pattern smaller than the original pattern was implemented by the isotropic shrinking of the hydrogel. It was found that the resolution of a pattern could be additionally improved by repeating this process. In this case, a scale bar=1 mm.

In the present embodiment, poly(sodium acrylate) hydrogel which may be repeatedly expanded and shrunk according to a salt concentration, was used. It was verified that the resolution of a replicated pattern could be further improved by repeating a process of replicating the pattern to another four-fold expanded hydrogel and shrinking the hydrogel to its original size.

FIGS. 20 and 21 are diagrams illustrating other examples in which the resolution of a replicated pattern was improved using shrinkable hydrogel in an embodiment of the present disclosure. Even in the present embodiment, after a pattern having a triangular shape was replicated to a surface of new hydrogel, a pattern smaller than the original pattern was implemented by the isotropic shrinking of the hydrogel. It was found that after a pattern was replicated to a surface of a soft material, the resolution of the pattern could be additionally improved using a physical property of the material.

FIG. 22 is a flowchart illustrating an example of the method of manufacturing a 2-D material according to an embodiment of the present disclosure. The method of manufacturing a 2-D material according to the present embodiment may include step 2210 of preparing a first material having a first nucleic acid patterned on a surface thereof, step 2220 of bonding a linker nucleic acid to the first nucleic acid, step 2230 of bonding the first nucleic acid and a second nucleic acid functionalized on a surface of a second material through the linker nucleic acid and replicating a pattern of the first material to the surface of the second material, step 2240 of separating the first material, and step 2250 of coating a third material on a pattern replicated to the surface of the second material.

Step 2210 may be an example of a process of the aforementioned target pattern marking described with reference to FIG. 2, for example. For example, a first material having a first nucleic acid patterned on a surface thereof may be generated by marking the target molecules on a surface of the first material with the first nucleic acid having a first sequence. Alternatively, the first material having the first nucleic acid patterned on a surface thereof may be prepared by a separate method. The surface of the first material may be flat or rough or may have a physical unevenness or pattern.

Step 2220 may be an example of a process of the aforementioned linker-DNA bonding described with reference to FIG. 3, for example. In this case, the linker-nucleic acid may have a structure in which a third nucleic acid having a second sequence (complementary to the first sequence of the first nucleic acid) and a fourth nucleic acid having a fourth sequence (complementary to the third sequence of the second nucleic acid) are connected by an inter-nucleic acid linker. In this case, the linker-nucleic acid may be bonded to the first nucleic acid by bonding the first nucleic acid having the first sequence and the third nucleic acid having the second sequence included in the linker-nucleic acid.

Step 2230 may be an example of a process of the aforementioned pattern transfer (contact) described with reference to FIG. 4. For example, a pattern of a first material may be replicated to a surface of a second material by bonding a fourth nucleic acid having a fourth sequence included in a linker-nucleic acid and a second nucleic acid having a third sequence due to physical contact between a surface of the first material and the surface of the second material.

Step 2240 may be an example of a process of separating the first material as the original material. Alternatively, specific sequences in a first nucleic acid, a second nucleic acid, a third nucleic acid, a fourth nucleic acid, an inter-nucleic acid connecting third and fourth nucleic acids, or double-stranded DNA formed by the hybridization between the first and third nucleic acids or between the second and fourth nucleic acids may be cut by chemical treatments or enzymes. Alternatively, separating the first material may include dehybridizing the first nucleic acid and the third nucleic acid while the hybridization between the second nucleic acid and the fourth nucleic acid has been maintained based on a difference in the bonding strength between the nucleic acids. Alternatively, after such an enzyme or chemical treatment is used, the two materials may be physically separated. Alternatively, more than one method mentioned above may be combined and used in a row. The separated first material may be reused to generate another pattern after attaching the first nucleic acid again or without any change according to an embodiment.

The third material applied in step 2250 may include at least one of single molecules, metals, polymers, ceramics, biomolecules, and cells, each functionalized with the first nucleic acid having the first sequence. The third material functionalized with the first nucleic acid having the first sequence may be bonded to the linker-nucleic acid of the pattern replicated to the surface of the second material. In this case, the third material may be the same material as the target molecule on the surface of the first material and may be a material different from the target molecule on the surface of the first material.

According to an embodiment, in step 2210, a first material including a plurality of patterns may be prepared. In this case, two or more of the plurality of patterns may have nucleic acids having orthogonal sequences. As already described, the orthogonal sequences may mean sequences in which a specific interaction does not occur because the sequences are not complementary to each other. In this case, a first nucleic acid may be one of the nucleic acids having such orthogonal sequences. In this case, in step 2220, a plurality of linker-nucleic acids, each of which includes a nucleic acid complementary to one of the first nucleic acids as its third nucleic acid, may be bonded to the first nucleic acids. In this case, all linker-nucleic acids may have identical fourth nucleic acid with the same sequence. Alternatively, linker-nucleic acids may have fourth nucleic acids that are orthogonal to each other. For example, FIG. 8 describes that multi-patterning is possible through a single process by simultaneously bonding a plurality of linker-nucleic acids, each of which may include a complementary sequence to one of the first nucleic acids, to the first nucleic acids. Likewise, in step 2230, a plurality of patterns of the first material may be replicated to a surface of a second material by physically bringing the first material into contact with the surface of the second material. In this case, the surface of the second material may be functionalized by second nucleic acids, each of which is complementary to the fourth sequence of one of the linker-nucleic acids. Alternatively, the surface of the second material may be functionalized by a nucleic acid, which is complementary to the fourth sequence of all linker-nucleic acid, when all linker-nucleic acids have identical fourth nucleic acid. In step 2250, a plurality of different third materials, each functionalized with a nucleic acid having orthogonal sequences may be applied on a pattern replicated to the surface of the second material. In this case, the plurality of the different third materials may be bonded to the nucleic acids on the replicated patterns.

In another embodiment, in step 2210, a first material including N (N is a natural number) patterns may be prepared. In this case, first nucleic acids constituting different patterns may be orthogonal to each other. In this case, two or more and M (M is an N multiplication of 2) or fewer types of patterns may be formed by reusing the separated first material. For example, a total of 15 ($2^4-1$) different patterns may be formed from one original having four patterns has been described with reference to FIG. 9. In this case, 15 or fewer patterns can be formed. Meanwhile, when the first material is reused, a plurality of linker-nucleic acids bonded to nucleic acids included in the N patterns may include nucleic acid having (N−1) or fewer types of different sequences. For example, FIG. 9 illustrates an example in which a new type of pattern is formed by reducing the number of first nucleic acids connected through linker-nucleic acids one by one. Another third material may be bonded to each of the different nucleic acids replicated to the second surface as described above.

In another embodiment, a second material may include a soft material. In this case, patterning resolution can be improved through a first step of shrinking a soft material to which a pattern has been replicated, a second step of replicating the pattern to another second material by using the shrunk soft material as a first material again, and a third step of repeating the first step and the second step A times (A is a natural number). For example, FIG. 10 illustrates an example in which patterning resolution is significantly improved by repeating pattern replication and the isotropic shrinking of the hydrogel as soft material.

In another embodiment, a second material may include a soft material. In this case, the original pattern may be greatly enlarged or may be replicated to a bent surface or a winding surface through a first step of expanding, bending or deforming a soft material to which a pattern has been replicated and a second step of replicating another second material to the pattern by using the expanded, bent or deformed soft material as a first material again.

In another embodiment, in step 2250, single-molecules, metals, polymers, ceramics, biomolecules, etc. may be attached to a third material or may be grown from the third material.

Meanwhile, a 2-D material manufactured according to embodiments of the present disclosure may include patterns replicated from a surface of the original material to a surface of the 2-D material via nucleic acid-mediated pattern replication, a second nucleic-acid functionalized on the surface of the 2-D material, a linker-nucleic acid connecting the first nucleic acid and the second nucleic acid, and an additional material coated on the surface of the 2-D material and bonded to the linker-nucleic acid of the pattern. In this case, the additional material may correspond to the third material described with reference to FIG. 22. If the original material includes a plurality of patterns, it can be easily understood that the plurality of patterns may be replicated to the 2-D material.

Furthermore, the patterns on the second material replicated according to embodiments of the present disclosure can be used as an etch mask. Recently, it has been known that a nucleic acid may be used as an etch mask. Accordingly, a physical pattern can be transferred to a surface of a second material by using, as an etch mask, a nucleic acid transferred to a pattern. Accordingly, a chemical pattern formed on a surface of a first material surface may be transformed into a physical pattern on the surface of the second material. In this process, a transferred physical pattern that is smaller than or greater than or is more bent than the chemical pattern on the surface of the first material can be formed using a hydrogel. A nucleic acid may be directly used as an etch mask. A third material replicated to a surface of a second material according to the present embodiment may be used as such an etch mask. Furthermore, materials grown from a replicated surface may be sintered, interconnected and post-processed to have conductivity. Such a post-processed third material may be used as an etch mask.

As described above, according to embodiments of the present disclosure, a pattern of biomolecules can be elaborately replicated and processed by using, as the original, a biological tissue, which was impossible using existing technologies. If a biological tissue mimic is manufactured and a biotechnology technology, such as a cell-sheet technology capable of sequentially stacking tissue slices, is combined by using the embodiments of the present disclosure, an artificial organ having an implantable level, etc. can be produced. As described above, it is expected that embodiments of the present disclosure will be used as a generic technology for artificial tissue and organ system and will offer a new paradigm in healthcare industry.

In particular, it is expected that the method of manufacturing a 2-D material according to embodiments of the present disclosure will provide a high-throughput artificial biological tissue manufacturing method that is essentially necessary for constructing artificial tissue and organ transplant system.

An artificial organ is a potential application field of the method of manufacturing a 2-D material according to embodiments of the present disclosure, and can greatly contribute to producing an artificial tissue and artificial organ having an implantable level because a distribution of various biomolecules on a surface of tissue can be replicated without any change. According to the method of manufacturing a 2-D material according to embodiments of the present disclosure, a nano-biochip having a single molecule level can be produced by elaborately fixing several biomolecules on various substrates. It is expected that the method can be usefully used in the health field, such as that the method is used as a precise bio-sensor for the diagnosis or patient-specific treatments. Furthermore, if a polymer material including hydrogel having high biocompatibility is used as a substrate, the present disclosure can contribute to manufacturing various biomedical materials which were difficult to be produced using the existing micro/nanostructure manufacturing technology.

A global tissue engineering market that constitutes artificial organ forms a volume of 89 billion in 2016, and occupies the greatest portion in markets related to tissue engineering and reproduction fields. As the development initiative of such an artificial organ is rapidly transferred from an initial public institution to a biotechnology company recently, it is determined that the artificial organ market using a reproduction medical science, such as a tissue engineering, a stem cell, and treatment cloning, will form a large market in the medical industry in the future. The method of manufacturing a 2-D material according to embodiments of the present disclosure may be combined with the existing technologies for manufacturing an artificial tissue and an organ, such as a 3D printing technology and a decellularization technology, and may play a role to overcome several limits involved in mass-producing an artificial organ having an implantable level.

The health industry is the industry for producing a product used in the human body and providing services based on the biotechnology and medical pharmacy knowledge, and includes manufacturing industries, such as medicines and medical devices, and medical health management service industries, such as digital healthcare services. With an increase of global aging population and health demands, it is expected that the scale of the biohealth global market will be rapidly expanded. It is expected that biochips, such as protein chips having resolution of a single molecule manufactured according to the method of manufacturing a 2-D material according to embodiments of the present disclosure, will be widely used as a biosensor for disease diagnosis and patient specific treatment, a test platform for clinical research of a medicine, etc. and will construct technological infrastructure necessary for the biohealth industry in the future.

If a tissue slice is replicated on hydrogel having excellent biocompatibility by applying the method of manufacturing a 2-D material according to embodiments of the present disclosure and merged by the cell-sheet technology, the tissue slice may be used as an artificial tissue. Such a method has advantages in that it does not require separate three-dimensional (3-D) support for cultivating an organ and can achieve resolution having a much higher level than that of a technology based on 3-D printing. Furthermore, it is expected that the method can be applied as a new concept replication medical platform which may be converged with a patient-specific medical system by ergonomically implementing an organ within the human body and a tissue-specific cell microenvironment.

If the method of manufacturing a 2-D material according to embodiments of the present disclosure is used, several types of single-molecule, metal, ceramics, etc. for diagnosing a disease in a medical science manner or which are accessorily used can be disposed along with a biomolecule. A complex biomedical material having a new concept can be easily manufactured. In the complex biomedical material market for medical treatment, most of the human body alternative materials are related to soft tissue. Such material is mechanically strong, but has problems in that it is likely to cause pain for a patient because it remains as foreign material and a second operation must be performed after a lapse of time. The method of manufacturing a 2-D material according to embodiments of the present disclosure will be used as a generic technology for providing a complex material for biomedical uses at a low price by arranging particles, such as various metals and ceramics, to a biomedical material.

Recently, the development of an artificial tissue body capable of replacing a small and middle animal experiment performed to obtain the permission of a product in the bio-health field has been in the spotlight. In this field, it is very difficult to establish a co-culture condition for various cells by securing a cell line, which acts as a major obstacle to a technology. In contrast, the method of manufacturing a 2-D material according to embodiments of the present disclosure can easily solve a problem by replicating a surface, that is, a target of a test, without any change. Accordingly, in particular, it is expected that the method can provide an experiment platform for further controlled clinical research because one object can be identically repeatedly replicated several times.

In embodiments of the present disclosure, a nucleic acid used to transfer a pattern is a stable biomolecule, enables an elaborate design and mass composition, and is already generally used in fields, such as biology, medical science, and material engineering. Accordingly, embodiments of the present disclosure may be flexibly combined with the existing technologies using a nucleic acid, such as a biochip manufacturing technology, a medicine screening technology, and a diagnosis technology, and may be applied to commercialized technologies and immediately used depending on various purposes.

The artificial organ bio market attempts a strategy for mass-producing such an artificial organ in addition to the development of an artificial organ having an implantable level. The method of manufacturing a 2-D material according to embodiments of the present disclosure can contribute to mass-production by replicating a tissue having an intermediate step of an artificial organ manufactured based on a transgenic heterogeneous organ or cell without any change, and thus can be effectively provided to demand institutes, such as local and overseas artificial organ bio companies or hospitals. Furthermore, the method can be effectively used to develop a patient-customized biomedical material that requires a relatively elaborate manufacturing technology in addition to limited product groups, such as artificial crystalline lens, an implant for a dentist, an artificial joint and cartilage which have been used for a long time. Accordingly, the method can expand a product group in the biomedical material market and raise market competitiveness.

According to an embodiment of the present disclosure, multiple physical patterns may be formed from one original pattern to another pattern. In the existing semiconductor process, only one physical pattern can be formed from one mask pattern. In an embodiment of the present disclosure, since original patterns can be formed as nucleic acids having different sequences, several thousands of or tens of thousands of patterns can be formed depending on into which nucleic acid which complementary linker-nucleic acid is inserted. Furthermore, it is expected that if the contraction, expansion, deformation, etc. of the hydrogel are used, limitations to the existing semiconductor process can be overcome because replication patterns having various sizes can be produced from one original pattern. The present disclosure may be used to pattern molecules, such as protein or nucleic acid, on a surface because the present disclosure can be performed in the water. Accordingly, the present disclosure may be used to manufacture a sensor or a nucleic acid chip based on an antibody.

As described above, according to embodiments of the present disclosure, the method of manufacturing a 2-D material capable of multi-patterning through a single process can be provided. Furthermore, the method of manufacturing a 2-D material capable of selectively and/or continuously replicating the original pattern can be provided. Furthermore, the method of manufacturing a 2-D material capable of high-resolution patterning based on a single molecule contact can be provided. Furthermore, the method of manufacturing a 2-D material which may be applied to various patterning materials and substrates can be provided. Furthermore, the method of manufacturing a 2-D material, which can achieve higher resolution than that of the original pattern can be provided. As described above, although the embodiments have been described in connection with the limited embodiments and drawings, those skilled in the art may modify and change the embodiments in various ways from the description. For example, proper results may be achieved although the above descriptions are performed in an order different from that of the described method and/or the aforementioned elements, such as the system, structure, device or apparatus, and circuit, are coupled or combined in a form different from that of the described method or replaced or substituted with other elements or equivalents.

Accordingly, other implementations, other embodiments, and equivalents of the claims fall within the scope of the claims.

The invention claimed is:

1. A method of manufacturing a two-dimensional (2-D) material, comprising:
preparing a first material having a first nucleic acid patterned on a surface thereof;
bonding a linker-nucleic acid to the first nucleic acid;
bonding the first nucleic acid and a second nucleic acid functionalized on a surface of a second material through the linker-nucleic acid and replicating a pattern of the first material to the surface of the second material;
separating the first material thereby forming a separated first material; and
coating a third material on the pattern replicated to the surface of the second material.

2. The method of claim 1, wherein preparing a first material comprises marking target materials or molecules on a surface of the first material with the first nucleic acid having a first sequence.

3. The method of claim 1, wherein the linker-nucleic acid has a structure in which a third nucleic acid, which is complementary to the first nucleic acid, and fourth nucleic acid, which is complementary to the second nucleic acid, are connected by a short inter-nucleic acid linker nucleic acid.

4. The method of claim 3, wherein bonding the first nucleic acid and a second nucleic acid comprises bonding the linker-nucleic acid to the first nucleic acid by bonding the first nucleic acid having a first sequence and the third nucleic acid having a second sequence included in the linker-nucleic acid.

5. The method of claim 3, wherein replicating a pattern of the first material comprises replicating the pattern of the first material to the surface of the second material by bonding the fourth nucleic acid, having a fourth sequence in the linker-nucleic acid, and the second nucleic acid having a third sequence through physical contact between the surface of the first material and the surface of the second material.

6. The method of claim 3, wherein separating the first material comprises cutting an inter-nucleic acid portion of the linker-nucleic acid, or cutting a bond between the first material and the second material by using an enzyme or a chemical reaction which recognizes and cuts a specific sequence of a bond between the first nucleic acid and the third nucleic acid or a bond between the second nucleic acid and the fourth nucleic acid.

7. The method of claim 3, wherein separating the first material comprises physically or chemically cutting a bond between the first nucleic acid and the third nucleic acid in a state in which a bond between the second nucleic acid and the fourth nucleic acid has been maintained based on a difference in bonding strength between the nucleic acids.

8. The method of claim 1, wherein the third material comprises a material comprising at least one of single molecules, metals, polymers, ceramics, biomolecules, and cells each functionalized with the first nucleic acid having a first sequence or a new nucleic acid containing a first sequence.

9. The method of claim 1, wherein the third material comprises a material identical with a material of target materials or molecules on the surface of the first material.

10. The method of claim 1, wherein the third material comprises a material different from a material of target materials or molecules on the surface of the first material.

11. The method of claim 1, wherein in coating a third material on a pattern, the third material is bonded to the linker nucleic acid remained on the surface of the second material as the third material is functionalized with the first nucleic acid having a first sequence or a new nucleic acid containing a first sequence.

12. The method of claim 1, wherein:
preparing a first material comprises preparing the first material comprising a plurality of patterns, two or more of the plurality of patterns comprise nucleic acids having orthogonal sequences, the first nucleic acid is one of the nucleic acids having the orthogonal sequences, bonding the first nucleic acid and a second nucleic acid comprises bonding nucleic acids included in the plurality of patterns and a plurality of linker-nucleic acids containing different nucleic acids, and the different linker-nucleic acids comprise nucleic acids having sequences complementary to the first nucleic acids having the orthogonal sequences, respectively.

13. The method of claim 12, wherein replicating a pattern of the first material comprises:

replicating the plurality of patterns of the first material to the surface of the second material by physically bringing the first material into contact with the surface of the second material, and the surface of the second material is functionalized with nucleic acids corresponding to each of the nucleic acids having the orthogonal sequences.

14. The method of claim 12, wherein coating a third material on a pattern comprises applying, on the pattern replicated to the surface of the second material, a plurality of different third materials functionalized with nucleic acids having the orthogonal sequences, respectively.

15. The method of claim 1, wherein:

preparing a first material comprises preparing the first material comprising N (the N is a natural number) patterns, nucleic acids constituting different patterns are orthogonal to each other, and 2 or more to M (the M is $2^N-1$) or fewer types of patterns are able to be formed by reusing the separated first material.

16. The method of claim 15, wherein when the first material is reused, a plurality of linker-nucleic acids bonded to first nucleic acids included in the N patterns comprises nucleic acids having (N−1) or fewer types of different sequences.

17. The method of claim 1, wherein:

the second material comprises a hydrogel, and the method further comprises:

a first step of contracting the hydrogel to which the pattern has been replicated thereby forming a contracted hydrogel;

a second step of replicating the pattern to another second material by using the contracted hydrogel as the first material again; and a third step of repeating the first step and the second step A times (the A is a natural number).

* * * * *